United States Patent
Shockley et al.

(10) Patent No.: US 7,276,164 B2
(45) Date of Patent: Oct. 2, 2007

(54) NITRATE REMOVAL IN A PURGE STREAM USING CONSTRUCTED WETLANDS

(75) Inventors: Chad E. Shockley, Los Angeles, CA (US); John D. Miller, Katy, TX (US); Piyush S. Shah, New Orleans, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 138 days.

(21) Appl. No.: 10/960,903

(22) Filed: Oct. 7, 2004

(65) Prior Publication Data
US 2006/0076290 A1  Apr. 13, 2006

(51) Int. Cl.
C02F 3/32 (2006.01)

(52) U.S. Cl. ............... 210/602; 210/903; 210/747; 210/170.08

(58) Field of Classification Search ............... 210/602, 210/605, 610, 615, 620, 630, 747, 903, 170.01, 210/170.08; 423/235–238
See application file for complete search history.

(56) References Cited

U.S. PATENT DOCUMENTS

| | | | |
|---|---|---|---|
| 3,919,848 A * | 11/1975 | Sullivan | 405/43 |
| 4,959,084 A * | 9/1990 | Wolverton et al. | 210/602 |
| 5,106,504 A | 4/1992 | Murray | |
| 5,830,357 A | 11/1998 | Vredenbregt et al. | |
| 5,929,126 A * | 7/1999 | Koveal et al. | 518/709 |
| 5,993,649 A | 11/1999 | DeBusk et al. | |
| 6,159,371 A * | 12/2000 | Dufay | 210/602 |
| 6,379,543 B1 * | 4/2002 | Bowman | 210/170.03 |
| 6,896,805 B2 * | 5/2005 | Austin | 210/602 |
| 2003/0111409 A1 * | 6/2003 | Austin et al. | 210/602 |
| 2003/0217954 A1 | 11/2003 | Towndrow | |
| 2004/0000517 A1 * | 1/2004 | Austin et al. | 210/602 |

FOREIGN PATENT DOCUMENTS

| | | |
|---|---|---|
| CA | 2237926 | 1/2000 |
| CA | 2313110 | 12/2001 |
| DE | 41 19 835 A1 | 12/1992 |
| DE | 10115662 | 10/2002 |
| FR | 2 690 683 A1 | 11/1993 |
| GB | 2182651 | 5/1987 |

(Continued)

OTHER PUBLICATIONS

"Pilot scale constructed wastewater treatment wetland", The Water Center, University of Washington (2001), http://depts.washington.edu/cwws.*

(Continued)

Primary Examiner—Fred G. Prince
(74) Attorney, Agent, or Firm—Glenn T. Barrett

(57) ABSTRACT

The present invention comprises a system and methodology for denitrification using constructed wetlands. The constructed wetlands of the present invention can be effectively applied as a wastewater point source treatment technology to any high total dissolved solids (e.g. sulfites and sulfates), carbon deficient wastewater stream for nitrate control. Pollutants are removed from the stream via a number of processes including plant uptake, volatilization, filtration and biological reduction. The present system and methodology offers an ability to reduce outflow stream nitrate concentrations in a cost-effective manner with minimal capital investment.

14 Claims, 2 Drawing Sheets

FOREIGN PATENT DOCUMENTS

| | | |
|---|---|---|
| JP | 2002370097 | 12/2002 |
| NL | 1001236 C1 | 10/1995 |
| WO | WO0048755 | 8/2000 |

OTHER PUBLICATIONS

Translated abstract of German reference DE10115662 obtained from Derwent World Patent Index.

Translated abstract of Japanese reference JP2002370097 obtained from Derwent World Patent Index.

Farabakhshazad, N., et al., Experimental approaches for investigating constructed vertical flow wetland technology, 2001 (abstract only). Abstract obtained from American Chemical Society.

Malesa, A., et al., Macrophytic treatment of petrochemical wastewater in reed-algal ponds. Part II. Study of the quality of water, 2000 (abstract only). Abstract obtained from American Chemical Society.

Machate, T. et al., Purification of fuel and nitrate contaminated ground water using a free water surface constructed wetland plant, 1999 (abstract only). Abstract obtained from American Chemical Society.

Bachand, A., et al., Denitrification in constructed free-water surface wetlands: II. Effects of vegetation and temperature, 2000 (abstract only). Abstract obtained from American Chemical Society.

Bachand, A., et al., Denitrification in constructed free-water surface wetlands: I. Very high nitrate removal rates in a macrocosm study, 2000 (abstract only). Abstract obtained from American Chemical Society.

Tong, Z., et al., Ammonium and nitrate removal in vegetated and unvegetated gravel bed microcosm wetlands, 1994 (abstract only). Abstract obtained from American Chemical Society.

Annadotter, H., et al., A new constructed wetland for combined reduction of phosphorus and nitrogen, 1995 (abstract only). Abstract obtained from American Chemical Society.

Oostrom, A., et al., Denitrification in constructed wastewater wetlands receiving high concentrations of nitrate, 1994 (abstract only). Abstract obtained from American Chemical Society.

Hammer, D. et al., Designing constructed wetlands for nitrogen removal, 1994 (abstract only). Abstract obtained from American Chemical Society.

Hamersley, "Control of denitrification in a septage-treating artificial wetland: the dual role of particulate organic carbon", Water Research, vol. 36, 2002, pp. 4415-4427.

International Search Report, PCT/US2005/034807.

Written Opinion, PCT/US2005/034807.

* cited by examiner

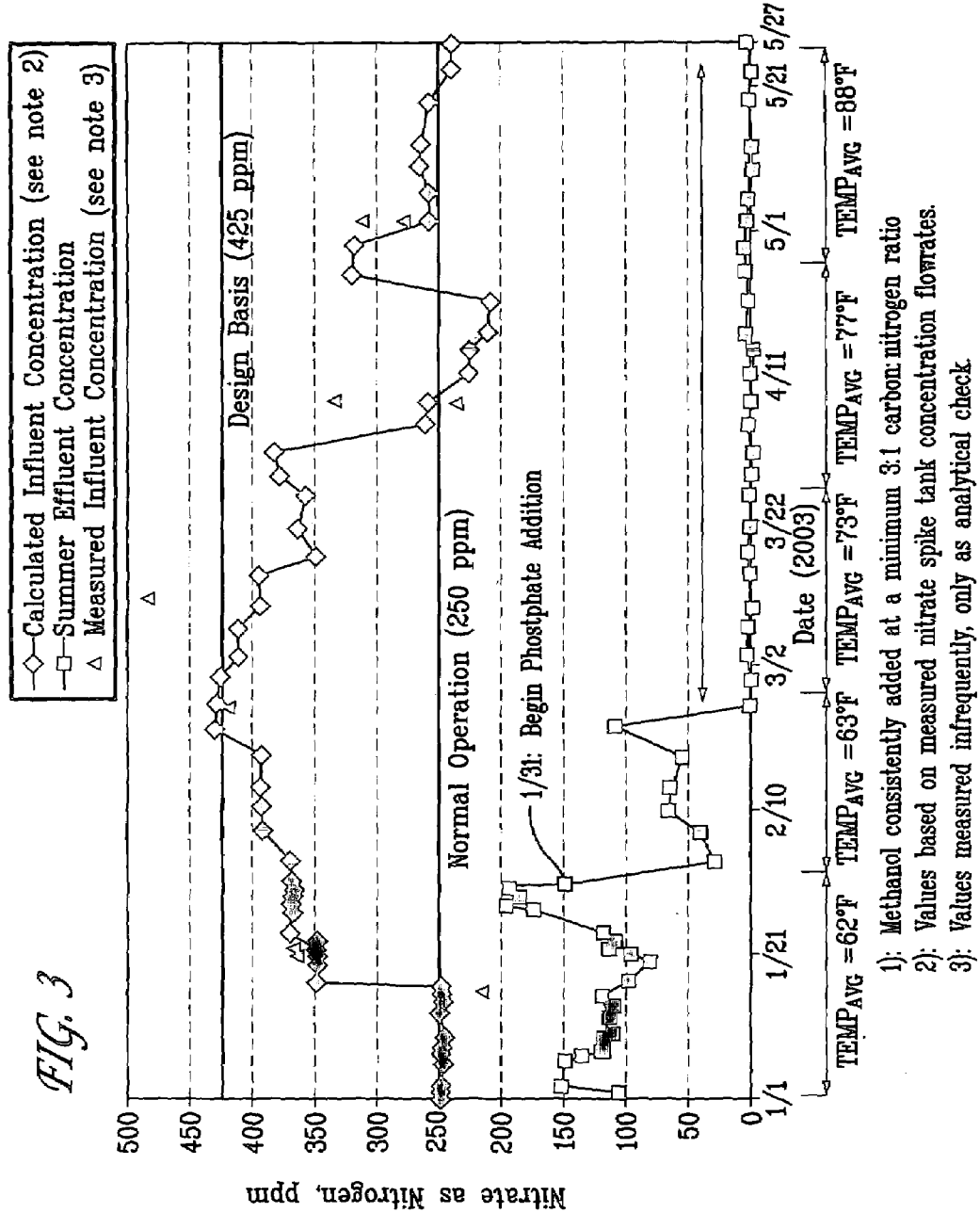

NITRATE REMOVAL IN A PURGE STREAM USING CONSTRUCTED WETLANDS

FIELD OF THE INVENTION

The present invention relates generally to the treatment of process purge streams and more particularly to nitrate removal from such streams via constructed wetlands.

BACKGROUND OF THE INVENTION

In existing scrubbed and saturated gas systems such as wet gas scrubbers (WGS) used in the petroleum industry and elsewhere, the offgas may contain NO and/or $NO_2$. These scrubbers may be used in connection with combustion units such as Fluid Catalytic Cracking Units (FCCUs) for the refining of crude oil. Chemicals such as sodium chlorite ($NaClO_2$) can be added to the scrubber liquor in order to oxidize NO to higher oxides such as $NO_2$ and $N_2O_5$. These higher oxides are more readily water soluble and can be removed from the system as nitrate and discharged in the wastewater stream.

However, some literature has shown that very high levels of nitrate in water could create health concerns. The nitrate outflow onto shallow continental shelves can produce undesirable near shore algae blooms. Nitrate's role as a plant nutrient can likewise cause undesirable plant growth in other water bodies such as ponds and lagoons. In the United States and Europe, legislation now specifies a maximum permissible nitrate and/or total nitrogen level in water for drinking or industrial discharge. Maximum legal nitrate levels in drinking water are currently 10 mg/liter ($NO_3$—N) in the United States. In the United States, Federal and State Agencies regulate nitrate concentrations in wastewater discharges and groundwater in an effort to reduce impact to the nation's water supply.

In general, prior art wastewater treatment processes have not emphasized the removal of nitrates from the effluent. Prior art techniques for removing nitrates from wastewater have either been ineffective or too expensive. In fact, point source treatment for effluent from, for example, WGS purges has heretofore been generally unavailable. As such, WGS purges containing nitrates and which are also high in salinity have been for the most part treated only with conventional treatment processes which do not address high salinity or high levels of nitrates in the effluent. Conventional secondary wastewater treatment plants are generally designed to primarily reduce carbon and ammonia concentrations via biological treatment. Other known solutions also suffer from various drawbacks such as being overly complex and/or expensive and/or being ineffective.

SUMMARY OF THE INVENTION

The present invention comprises a system and methodology for denitrification using constructed wetlands. The constructed wetlands of the present invention can be effectively applied as a wastewater source treatment technology to any high total dissolved solids (e.g. sulfites and sulfates), carbon deficient wastewater stream for nitrate control. Pollutants are removed from the stream via a number of processes including plant uptake, volatilization, filtration and biological reduction. The novel process of the present invention permits point source treatment of high nitrate and/or high salinity effluents prior to conventional wastewater treatment. By treating the source stream, significant advantages in terms of minimizing land requirements and maximizing effluent treatment efficiencies can be obtained.

As will be recognized by one of skill in the art, the present system and methodology offers an ability to reduce outflow stream nitrate concentrations in a cost-effective manner with minimal capital investment. The passive system of the present invention requires minimal maintenance and/or operator oversight. The passive system also reduces the requirements for chemical addition.

In one aspect, provided is a method for removing nitrates from an effluent including the steps of: introducing the effluent into a constructed wetlands system as an influent, permitting the influent to flow through the constructed wetlands system wherein the constructed wetlands system comprises vegetation and microbial cells operating to convert the nitrates into nitrogen gas and other byproducts, discharging the influent from the constructed wetlands system in a form containing an amount of nitrates which is less than the amount of nitrates in the influent when introduced into the constructed wetlands system, and introducing said discharged influent into a wastewater processing operation.

In another aspect, provided is a constructed wetlands system for reducing the amount of nitrates contained within an effluent stream, the constructed wetlands system comprising: a plurality of wetlands areas comprising vegetation and microbial cells operating to convert the nitrates into nitrogen gas and other byproducts, an inlet permitting the effluent stream to flow into the constructed wetlands system, and at least one gravel berm, the at least one gravel berm permitting the influent to flow from one the wetlands area to another of the wetlands areas.

In a further aspect, provided is a method for processing a nitrate-rich WGS purge which is high in total dissolved solids, the method comprising the steps of: processing the WGS purge to settle and remove dissolved solids contained in the purge to produce a first effluent, introducing the first effluent into a constructed wetlands to remove nitrates from the first effluent via bacterial action to produce a second effluent, and introducing the second effluent into a wastewater treatment process.

These and other advantages of the present invention will be apparent to those skilled in the art in connection with the following discussion and the attached figures.

BRIEF DESCRIPTION OF THE DRAWINGS

FIG. 3 is a chart illustrating test results for nitrate removal effectiveness when using the novel constructed wetlands of the present invention.

DETAILED DESCRIPTION OF THE PREFERRED EMBODIMENTS

Figure 1:
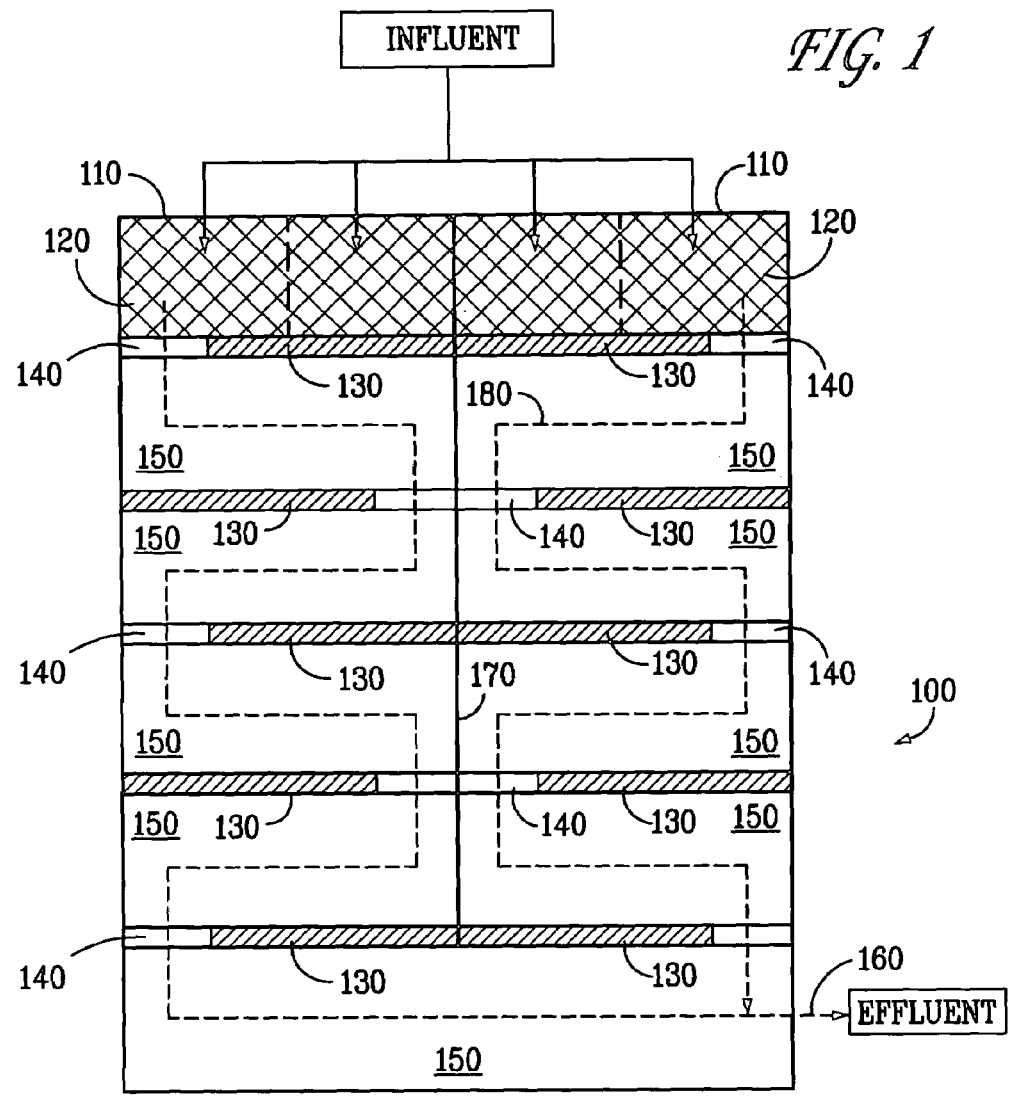
FIG. 1 is a top view of a constructed wetlands system as designed according to a preferred embodiment of the present invention.
Figure 2:
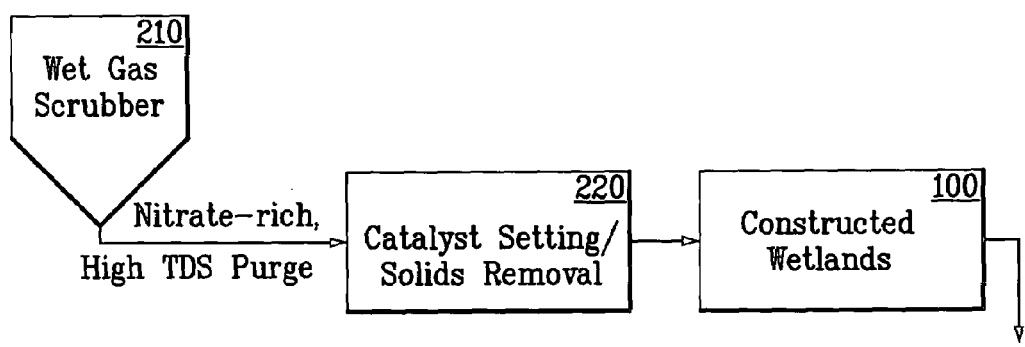
FIG. 2 is a process flow diagram illustrating an exemplary process for removing nitrates from a WGS purge.

Existing scrubbed/saturated gas systems such as wet gas scrubbers on combustion units such as fluid catalytic cracking units typically generate an offgas containing NO and $NO_2$. One method for removing these components from the system is to add oxidants to the scrubber system to oxidize these compounds to higher oxides such as $N_2O_5$. These higher oxides are more readily water soluble and can be removed from the system as nitrate.

As discussed above, these nitrates generally require some form of treatment prior to introduction into discharge lagoons or other water bodies. According to the teachings of the present invention, a novel form of constructed wetlands is disclosed. The constructed wetlands of the present invention can be effectively applied as a wastewater point source treatment technology to any high total dissolved solids (e.g. sulfites and sulfates), carbon deficient wastewater stream for nitrate control. The wetlands of the present invention operate to remove pollutants via many different processes including plant uptake, volatilization, filtration and biological reduction.

The primary method for pollutant removal according to the present invention is through biological reduction. Surface wetlands combine wetland plants, soils and hydrology to provide an ideal environment for the proliferation of bacteria. These bacteria, which are mostly heterotrophic, are responsible for the biological reduction of nitrate and the resulting denitrification. Denitrification is the microbial conversion of nitrate to nitrogen gas in an oxygen-deprived (anoxic) environment with a readily degradable carbon source. Denitrifying bacteria use nitrate and nitrite as electron acceptors during respiration to generate cell energy. Through this process, nitrates are converted into nitrogen gas, which is inert and poses no substantive environmental impact. The reaction caused by the microbial cells is described as:

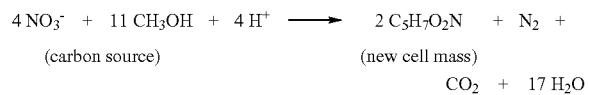

The constructed wetlands according to the present invention provide an ideal environment for the removal of nitrate via the above reaction. Since treatment of the target effluent is accomplished separately from the general plant effluent, which is diluted with other wastewater streams, significant advantages in terms of reduced land requirements and increased treatment efficiencies are obtained. Following point source treatment of the target nitrate containing effluent via the methodology of the present invention, the stream may be combined with the general plant effluent for conventional wastewater treatment. As will be discussed below in greater detail, since the effluent from, for example, a WGS purge is treated herein in its concentrated state; land requirements for wetlands are substantially reduced. For example, according to one preferred embodiment of the present invention, wetlands for a design flow rate of 350 gallons per minute may require approximately 6-7 acres whereas, without a separate point source treatment according to the teachings of the present invention, the same effective nitrate removal would require wetlands sized at approximately 300 acres.

The wetlands of the present invention are designed and planted with appropriate vegetation adapted to the expected water chemistry and water levels. Vegetation should be selected as is known in the art particularly using plants that are salt water tolerant and that can withstand substantial and long-term water inundation. It is also preferable to select vegetation, which is indigenous to the area to minimize environmental impact and increase the likelihood of plant survival and flourishing. Plants should also be selected based upon the expected water depth within the wetlands system. For example, water depth may be on the order of two feet.

The extensive system of plant roots, stems, leaves and soil provide a substantial surface area for the desired biological activity. In addition to serving as a growth media, plant litter will accumulate over time in the wetland environment and serve as a continuing carbon source for the above-described reaction. It is not, therefore, necessary to continually add an external carbon source over time to ensure the continuity of the nitrate removal effectiveness. Notwithstanding this, in a preferred embodiment, a carbon source such as methanol may be introduced into the wetlands system via, for example, the influent line at the early stages of the wetlands use prior to self-sustaining plant decay within the system. Additionally, phosphorus in the form of phosphoric acid may be introduced into the system over time in order to promote the Adenosine Triphosphate (ATP) cycle and related bacteria function.

As a result, and in accordance with the system and methodology of the present invention, the combination of the plants, an anoxic environment and the resulting biological activity creates an ideal, self-sustaining, passive treatment system for nitrate reduction and removal.

Naturally occurring wetlands trap suspended solids and remove nutrients and other pollutants prior to introduction of the stream into an environmentally sensitive location. The constructed wetlands treatment system of the present invention is designed to optimize the treatment performance of a natural wetland in order to treat point source discharges of process wastewater. In the constructed wetlands of the present invention, it is necessary to maximize hydraulic control over the system for peak performance. By maintaining hydraulic control over the system, "short-circuiting" is minimized, thereby increasing biological contact time in the wetlands to permit the required reaction to occur.

Turning now to FIG. 1, one embodiment of the constructed wetlands of the present invention is illustrated. As can be seen in the figure, raw influent, which may comprise the process point stream from, for example, a wet gas scrubber, is introduced into constructed wetlands system 100 via influent area 110. Influent area 110 may comprise, in a preferred embodiment, a distribution pipe with one or more "T" connectors to distribute flow over the lateral entry space into wetlands system 100. Wetlands system 100 is preferably comprised of an excavated area, which may be, for example, 5 to 10 acres. The excavated area may be in the range of up to four feet deep although deeper or shallower implementations are possible. In one embodiment depth and plantings are designed such that water depth within wetlands system 100 averages on the order of 12-18 inches. Also, in one preferred embodiment, the slope running from the influent entry point to the exit point may be an approximately 4 to 1 downgrade. The excavated area may be surrounded by a berm along the perimeter, which may comprise compacted soil and or some other impermeable material such as a geo-textile liner.

Within wetlands system 100, the influent first flows through an area containing sacrificial plant forebays 120. Sacrificial plant forebays provide total suspended solids (TSS) control in that they serve to remove as much of the suspended solids as possible prior to flow into the subsequent wetlands areas. This serves to limit more frequent maintenance operations to only the plant forebays 120 instead of all of the remaining wetlands areas 150. Maintenance in the forebays 120 may consist of periodic excavation of solids and replanting as necessary. Sacrificial plants contained in forebays 120 may be planted as plugs, stalks or existing plants depending upon how quickly system 100 is expected to be operational. It is preferable that forebays 120 contain plants packed more densely than those in the subsequent wetlands areas 150. In a preferred embodiment of the invention, wetlands system 100 is constructed to form at least two independent subsystems separated by wall 170. Wall 170 may comprise compacted soil and/or an impermeable material such as a geo-textile liner. While FIG. 1 illustrates a system with two separate subsystems, more are possible with the only limitations being space and cost constraints.

As shown in FIG. 1, each subsystem provides a separate flowpath for the influent to flow through wetlands system 100. Following flow through sacrificial plant bays 120, the fluid is forced to flow in each subsystem through a gravel berm 140 with flow being restricted in other areas by a length of impermeable berm 130. Impermeable berm 130 may comprise compacted soil and/or an impermeable material such as a geo-textile liner. A liner is especially preferable if the localized soil tends to be silty. Gravel berms 140 are constructed using large, porous gravel media to allow flow through them. They are preferably designed to prevent fluid channeling, encourage plug flow through wetlands system 100 and to serve as an additional growth surface for microbes. In a preferred embodiment, gravel berms 140 are selected to provide as much surface area as possible to encourage bacteria growth. It is also preferable that gravel berm 140 is implemented to impede "short-circuiting" by providing an appropriate level of flow resistance. In one preferred embodiment, gravel berm 140 may comprise riprap, which is approximately 4-6" in size. If the gravel size is too small, plugging may result.

Once the flow passes through gravel berms 140 in each subsystem, it enters a first wetlands area 150. Wetlands 150 are constructed based upon various criteria. There are a variety of hydrological conditions that influence the available plant types. Additionally, plants must be suited to survive and, indeed, thrive within the conditions created by the expected process wastewater. For example, salinity, pH, amount and type of suspended solids and pollutant levels are some of the factors influencing plant selection and placement. In addition, the selected plants must be able to survive and flourish under local environmental and atmospheric conditions.

After flowing through a first wetlands area 150, the flow is directed in each subsystem through another gravel berm 140 into a second wetlands area 150. A portion of the pathway into second wetlands area is blocked by another portion of impermeable berm 130 as shown in FIG. 1. In a preferred embodiment, constructed wetlands 100 by design, causes the influent stream to flow during wetlands processing in a serpentine fashion so as to distribute the bacterial action over as large a portion of the overall wetlands as possible. This also provides additional residence time within constructed wetlands system 100 for the fluid so as to maximize the amount of reaction and thus the amount of nitrate removal.

In one preferred embodiment of the present invention, the width of gravel berm 140 is approximately fifty feet wherein the overall width of the excavated area of wetlands system 100 is approximately 150 feet. According to this example, a wetlands area of 6-7 acres with a designed influent flow rate of 350 gallons per minute will provide a fluid retention time of five days as is preferable to permit acceptable processing levels.

As shown in FIG. 1, flow continues through a number of wetlands areas 150 throughout system 100 via paths through gravel berms 140. This provides a serial processing of the influent through multiple wetland areas so as to achieve maximum effectiveness in nitrate reduction. While FIG. 1 shows for each subsystem a flow path of one sacrificial plant forebay, four individual wetlands areas and one common wetlands area, such a configuration is merely exemplary. For example, more or less than four individual wetlands areas 150 may be used, more or less than one sacrificial forebay 120 per subsystem may be used and more or less than one common wetlands area 150 may be used. Similarly, the sacrificial forebay 130 may be common to multiple subsystems or it may be associated with only a single subsystem.

As shown in FIG. 1, the fluid, after being treated, is expelled as effluent via outlet 160. Outlet 160 is preferably designed to allow an operator to selectively control the amount of flow exiting the wetlands system 100 so as to control and selectively change the water depth and flow rates within system 100. Additionally, although not shown in FIG. 1, constructed wetlands system 100 of the present invention preferably includes one or more bypass structures which allows for maintenance operations while still permitting continuous system operation via fluid diversion as required. For example, this may be used to periodically address solids buildup within system 100.

In a preferred embodiment of the present invention, various additional design criteria are preferably included within wetlands system 100. First, it is preferable to include an influent flow distributor. Secondly, it is preferable that a maximum slope of 1% be used to facilitate flow through system 100.

Pilot plant testing was conducted to determine the feasibility of constructing, operating, and maintaining a surface flow constructed wetlands to effectively reduce nitrate levels for source treatment of a high total dissolved solids, carbon deficient, nitrate-rich wastewater stream (i.e.: WGS purge water). In the case of a purge stream from a wet gas scrubber 210, the wetlands system 100 of the present invention is located downstream of a catalyst/solids settling and removal step 220 following the WGS purge and before the purge water enters constructed wetlands system 100. Testing was performed at a large refinery complex under the following conditions:

| | |
|---|---|
| Nitrate Inlet Concentration = | 100 to 425 ppm nitrate as nitrogen |
| Water Temperature = | 55 to 90° F. |
| Total Dissolved Solids (TDS) = | 1.5% to 6.5% primarily as sulfites and sulfates |
| Primarily sulfites and sulfates Hydraulic Retention Time (HRT) = | >5 days |
| Carbon to Nitrogen Ratio = | 3:1 to 4.5:1 |
| Carbon to Phosphorus Ratio = | 100:1 |
| Water pH = | 7.5 to 8.5 |
| Dissolved Oxygen = | approximately 0 ppm |

Testing occurred from January to May with water temperatures ranging from 55 degrees F. to over 90 degrees F. At temperatures greater than 70 degrees F., nitrate removal efficiencies increased to 95+%. Also, with carbon, phosphorus, and nitrate optimization, influent nitrate concentrations were reduced by greater than 95% at influent concentrations as high as 425 ppm $NO_3$—N.

Further details concerning the tests conducted using the novel wetlands system of the present invention is shown in connection with the chart of FIG. 3. Initial nitrate feed concentrations were approximately 125 ppm ($NO_3$—N) to acclimate the constructed wetlands system. During this acclimation period, an average 95% of the nitrate feed concentration was removed. To simulate performance efficiency at a higher concentration, nitrate feed concentrations were doubled to 250 ppm ($NO_3$—N). In these tests, nitrate concentrations were reduced by only 60% to 70%.

The consistent removal of nitrate suggested that the high TDS values did not impact biological denitrification. Therefore, it was decided to increase the feed nitrate concentration to approximately 365 ppm ($NO_3$—N). Under these conditions, nitrate removal rates decreased to approximately 50% compared to the base case nitrate removal rates, which were approximately 60% to 70%. Overall, while nitrate removal efficiency decreased as nitrate concentration increased, mass loading removal rates remained constant. This suggested that the constructed wetlands pilot plant system was nutrient limited. As testing continued, methanol addition was increased from 3:1 to 4.5:1, and phosphorus was added to address nutrient limitation and to establish optimal performance parameters. In addition, inlet water temperatures remained consistent during the pilot plant testing period. After phosphorous addition was introduced, inlet average temperatures were held constant at ~63° F., ~73° F., ~77° F. and ~86° F. for approximately four weeks each during the second, third, fourth and fifth test program months, respectively. During the optimization months, nitrate removal efficiencies increased to greater than 95%.

The original goal of the constructed wetlands operation was to achieve an 80% average annual reduction in nitrate concentration. After this successful pilot plant demonstration, the average annual reduction in nitrate concentration goal has been increased to 90% to 95% during normal optimal operational conditions (i.e. 95% reduction at temperatures greater than 70 degrees F.).

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

The invention claimed is:

1. A method for removing nitrates from an effluent comprising:
introducing said effluent into a constructed wetlands system as an influent to permit said influent to flow through said constructed wetlands system wherein said constructed wetlands system comprises vegetation and microbial cells operating to convert said nitrates into nitrogen gas and other byproducts, wherein the constructed wetlands system comprising an influent area, at least one sacrificial plant forebay for initial removal of total suspended solids from said influent, at least one wetland area and at least one berm separating the at least one sacrificial plant forebay from the at least one wetland area and one wetland area from another wetland area, wherein the berm having an impervious section which prevents the flow of influent there through and a pervious section which permits the influent to flow there through;
introducing the influent into the influent area;
permitting the influent to flow from the influent area into the at least one sacrificial plant forebay over a predetermined area of the at least one sacrificial plant forebay;
permitting the influent to flow through the at least one sacrificial plant forebay;
permitting the influent to flow through the pervious section of the berm into a predetermined portion of the at least one wetland area;
discharging said influent from said constructed wetlands system in a form containing an amount of nitrates which is less than the amount of nitrates in said influent when introduced into said constructed wetlands system; and
introducing said discharged influent into a wastewater processing operation.

2. The method of claim 1 wherein said effluent is nitrate rich and of high salinity.

3. The method of claim 1 wherein said influent is a purge stream from a wet gas scrubber.

4. The method of claim 3 wherein said wet gas scrubber is in connection with a fluid catalytic cracking unit for refining crude oil.

5. The method of claim 1 wherein said constructed wetlands system comprises a plurality of separate subsystems for separately processing a plurality of portions of the total influent, wherein each of the separate subsystems comprising:
an influent area;
a sacrificial plant forebay for initial removal of total suspended solids from said influent;
at least one wetland area; and
at least one berm separating the sacrificial plant forebay from the at least one wetland area, and one wetland area from another wetland area, wherein the berm having an impervious section which prevents the flow of influent there through and a pervious section which permits the influent to flow there through.

6. The method of claim 1 where said influent area is an inlet distribution pipe which distributes said influent flow among a plurality of lateral locations into the at least one sacrificial plant forebay.

7. The method of claim 1 wherein said constructed wetlands system comprises a plurality of wetlands areas, wherein each wetland area being separated from an adjacent wetland area by one of the least one berm.

8. The method of claim 1 wherein said pervious berm comprises a plurality of rocks configured to maximize surface area for the growth of said microbial cells.

9. The method of claim 1 further comprising:
adding a carbon source to said influent prior to its introduction into said constructed wetlands system.

10. A constructed wetlands system for reducing the amount of nitrates contained within an effluent stream, said constructed wetlands system comprising:
an influent area for introducing the effluent stream into the constructed wetlands system;
at least one sacrificial plant forebay for initial removal of total suspended solids from the effluent stream, wherein the at least one sacrifical forebay be constructed and arranged to receive the effluent stream from the influent area;
at least one wetland area operatively connected to the at least one sacrificial plant forebay comprising vegetation and microbial cells operating to convert said nitrates into nitrogen gas and other byproducts; and at least one berm separating one of the at least one sacrificial plant forebay from the one of at least one wetland area and one wetland area from another wetland area, wherein each of the at least one berm having an impervious section which prevents the flow of influent there through and a pervious section which permits the influent to flow there through in a predetermined location.

11. The constructed wetlands system of claim 10 wherein said effluent stream is the purge stream from a wet gas scrubber.

12. The constructed wetlands system of claim 10 wherein said effluent stream is nitrate rich and of high salinity.

13. The constructed wetlands system of claim 10 wherein the pervious section is a gravel berm comprises a plurality of rocks configured to maximize surface area for the growth of said microbial cells.

14. A method for processing a nitrate-rich wet gas scrubber purge which is high in total dissolved solids, said method comprising:
   processing said wet gas scrubber purge to settle and remove dissolved solids contained in said purge to produce a first effluent;
   introducing said first effluent into a constructed wetlands to remove nitrates from said first effluent via bacterial action to produce a second effluent, wherein the constructed wetlands comprising an influent area, at least one sacrificial plant forebay for initial removal of total suspended solids from said first influent, at least one wetland area and at least one berm separating the at least one sacrificial plant forebay from the at least one wetland area and one wetland area from another wetland area, wherein the berm having an impervious section which prevents the flow of influent there through and a pervious section which permits the influent to flow there through, wherein introducing said effluent to produce a second effluent comprising:
   introducing the first effluent into the influent area;
   permitting the first effluent to flow from the influent area into the at least one sacrificial plant forebay over a predetermined area of the at least one sacrificial plant forebay;
   permitting the first effluent to flow through the at least one sacrificial plant forebay;
   permitting the first effluent to flow through the pervious section of the berm into the at least one wetland area;
   permitting the first effluent to flow through at least one wetland area to produce the second effluent; and
   introducing said second effluent into a wastewater treatment process.

* * * * *